United States Patent [19]

Eichinger

[11] 4,176,549

[45] Dec. 4, 1979

[54] HYDRAULIC RIGGING DEVICE

[75] Inventor: Johann Eichinger, Vaterstetten, Fed. Rep. of Germany

[73] Assignee: Carl Hurth Maschinen- und Zahnradfabrik, Munich, Fed. Rep. of Germany

[21] Appl. No.: 938,071

[22] Filed: Aug. 30, 1978

[30] Foreign Application Priority Data

Sep. 7, 1977 [DE] Fed. Rep. of Germany ....... 2740197

[51] Int. Cl.$^2$ .......................................... G01M 13/02
[52] U.S. Cl. .................................................. 73/162
[58] Field of Search ......................... 73/162, 168, 134

[56] References Cited
FOREIGN PATENT DOCUMENTS 421899 11/1974 U.S.S.R. ................................. 73/162

Primary Examiner—Donald O. Woodiel
Attorney, Agent, or Firm—Blanchard, Flynn, Thiel, Boutell & Tanis

[57] ABSTRACT

A hydraulic test stand for testing of shafts, couplings, gears and gear transmission systems. A pair of hydro-units are provided, one of which functions as a pump and the other one of which functions as a motor. Each of the hydro-units has a shaft thereon. A reversible drive motor is provided for driving the shaft of the hydro-unit functioning as a pump. High pressure lines and low pressure lines are connected in circuit with the hydro-units to provide an oil circulation circuit. The setting member has a pair of rotatable shafts thereon interconnected therewith. A driving rotation of either one of the shafts effects a driven rotation of the other shaft so that the torque output on the shaft from the hydro-unit which functions as a motor is included into the power flow consideration of the test stand and is used to drive through the test member the hydro-unit which functions as a pump so that the drive means must then only yet balance out the occurring losses within the system. Pressure-regulating devices for limiting the pressures in the high pressure and low pressure lines are provided and, in addition, an arrangment is provided for compensating for leakage losses within the oil circulating circuit.

12 Claims, 5 Drawing Figures

HYDRAULIC RIGGING DEVICE

FIELD OF THE INVENTION

The invention relates to a rigging device and, more particularly to a testing device for testing gear transmission arrangements, shafts and the like.

BACKGROUND OF THE INVENTION

To test power-transmitting parts like shafts, couplings, gears, gearings etc. with respect to load, deformation, sound etc., so-called rigging test stands have been known for a long time. As a rule, the corresponding connections of two similar mirror-image arranged testing members are connected to one another and the free connections are connected through spur gearings or the like which belong to the test stand and shafts in such a manner that a closed gear train is created, into which additionally is inserted a loading or rigging device and which is driven externally by a motor at the necessary speed. The motor needs only to balance out the power loss which occurs in the closed gear train, namely must come up with only a small part of the entire power needed for the testing. Such a test stand is for example known from German OS No. 17 73 542.

It is also possible to arrange only one testing member in the closed gear train, however, only when the testing member has no gear ratio between the input and output side, as for example shafts (compare drive technique 11 (1972), No. 9, Page 334), or has a gear ratio which remains constant, as for example pure reduction gearings, which can be balanced out with the gear system of the closed gear train, which gear system belongs to the test stand.

In every case all elements of the gear train, thus spur gearing, shafts, rigging device, connecting elements etc. must be adjusted to the testing member or the two testing members, namely with respect to the power to be transmitted, the connections, and the dimensions and the transmission ratio of the testing member or the testing members. To examine individual pieces or only small pieces, as they must be carried out as a rule in testing departments, such rigging test stands can mostly not be used because of the financial and timely expenditures for obtaining new elements to facilitate a connection and use therewith.

Therefore, the basic purpose of the invention is to provide a rigging device which can be utilized as universally as possible. The rigging device or test stand makes possible the testing of individual pieces without great or expensive change-over operations just as the testing of larger numbers of pieces, whereby the testing members can be of many various types, structural form and size.

SUMMARY OF THE INVENTION

The objects and purposes of the invention are met by providing a hydraulic rigging or test stand arrangement for testing of shafts, couplings, gears and gear transmission systems which includes a pair of hydro-units of which one functions as a pump and the other one functions as a motor. Each of the hydro-units has a shaft thereon. A reversible drive means is provided for driving the shaft on the hydro-unit functioning as a pump. A high pressure line and a low pressure line are connected in circuit with the hydro-units such that an oil circulation circuit is created. A testing member having gearing therein and a pair of rotatable shafts thereon connected to the gearing, is connected to the respective shafts of the hydro-units so that a driving rotation of either one of the shafts to the hydro-units will effect a driven rotation of the other shaft so that the torque output on the shaft from the hydro-unit which functions as a motor is included into the power flow consideration of the test stand arrangement and is used to drive through testing member the hydro-unit which functions as a pump so that the drive means must then only yet balance out the occurring losses within the system. Pressure-regulating means are provided for limiting the pressure in the high pressure and low pressure lines and balancing means are provided for balancing out the leakage losses which are created in the oil circulating circuit.

With a rigging device of the above-described type, it is possible to examine testing members both in pairs and also individually, because the substantially flexible connection of the hydro-units among one another permits an optimum adjustment to the testing members or the respective testing member. In particular, in the case of bevel gearings this is preferable, of course, however, also in the case of planetary and spur gearings with offset drive and output members. Gear transmission ratios to almost i=3 can be tested with an adjustable hydro-unit, up to approximately i=8 with two adjustable hydro-units without installation of further intermediate gearings in the power train. In the case of small testing members, a full-load testing is possible; in the case of larger testing members one will prefer for economical reasons a testing at full torque and at low speed by using intermediate gearings (the full torque load gives evidence with respect to elastic deformations of housings and mountings and with respect to the contact reflection behavior of gear-tooth systems).

Further advantages and characteristics of the invention are disclosed in the following description.

BRIEF DESCRIPTION OF THE DRAWINGS

The invention is discussed in connection with the exemplary embodiments which are illustrated in FIGS. 1 to 5.

In the drawings.

DETAILED DESCRIPTION

Figure 1:
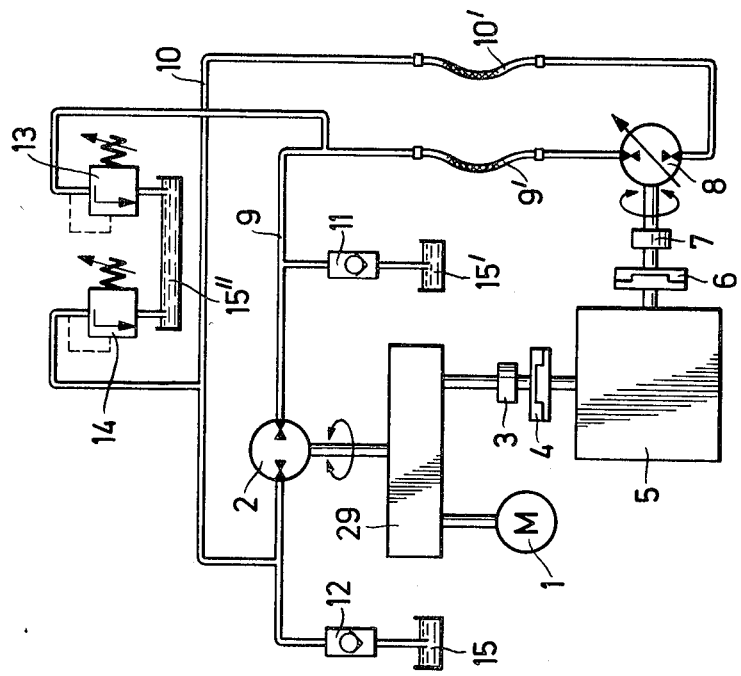
FIG. 1 illustrates an exemplary embodiment for the simplest type of a testing device according to the invention, in which the drive motor is integrated into the power train.

FIG. 1 illustrates a hydraulic rigging or test stand device embodying the invention in its simplest form. A double shafted electric motor 1 is connected through a first shaft 1A to a hydro-unit 2 which functions as a pump and through a second shaft 1B to a measuring shaft 3, a coupling 4 which is rigid and resistant to torsion, for example a toothed coupling and an aggregate 5 which is to be tested. The aggregate 5 can, for example, have bevel gearing having a gear transmission ratio of i=1, the one shaft of which bevel gearing is connected to the coupling 4. The other shaft of the gearing is connected to a hydro-unit 8 which functions as a fluid motor through a series connected coupling 6 which is rigid and resistant to torsion and a measuring shaft 7. The capability of controlling the hydro-device will be discussed hereinbelow. Depending on the intended tests, one of the two measuring shafts 3,7 can be omitted without changing the principle of the inventive device. The hydro-units 2,8 are connected through hydraulic lines 9,10 such that an oil circulation is possible. In order to utilize the rigging device as universally as possible, the lines are formed at least for a part of their length preferably by hoses 9',10'. Check valves 11 and 12 and pressure-regulating valves 13 and 14 are each connected to both the line 9 and also to the line 10. All of these valves are connected to an oil reservoir, which for clarity purposes has been schematically illustrated several times and is identified by the reference numerals 15,15',15". Of course, conventional and, therefore, not illustrated filters can be placed between the reservoirs and the check valves 11 and 12.

During the initial phase of operation, the hydro-unit 2 which operates as a pump is driven first by the E-motor 1, which also drives the testing aggregate 5. The hydro-unit 2 draws oil from the reservoir 15, which oil is fed through the lines 9,9' to the hydro-unit 8 which operates as a motor. The hydro-unit 8 has an in-take volume which is less than the conveying or output volume of the hydro-unit 2. Thus, a pressure can build up in the line 9,9', which pressure is removed in the hydro-unit 8 by conversion into kinetic energy. The oil is returned through the line 10,10' to the inlet to the hydro-unit 2 which operates as a pump: the oil circulation circuit is closed.

(The following embodiments refer to the line which extends from the hydro-unit which functions as a pump to the hydro-unit which operates as a motor as a HP-line, the returning line as a LP-line, since the pressure and check line terminology would here not always be clear.) The pressure in the lines 9,9',10,10' can be adjusted by the pressure-regulating valves 13,14.

With an increasing pressure in the line 9,9' the power input to the testing member 5 from the hydro-unit 8 rises and is transmitted by the testing member 5. This power input factor is included in the computation of total power used, by being used for driving the hydro-unit 2 which operates as a pump. To the same degree at which the power output from the hydro-unit 8 rises, the power output from the E-motor 1 drops until finally a nominal value is achieved, which corresponds with the power loss which is created in the system. Oil which is lost through leakage is again drawn into the circulation circuit through the check valve 12 by the hydro-unit 2 which functions as a pump.

With the product from the pressure difference Δp between the lines 9,9' and 10,10' and the geometric stroke volume Vg, after the relation $$M \sim \Delta p \cdot V g$$

a possibility for determining the torque M to be transmitted by the testing member or the rigging in the mechanical system is provided. The output signals taken from the measuring shafts 3,7 are conducted to not shown measuring devices, which for example can indicate the speeds and the occurring torques. On the other hand, the output signals can be converted in also not shown control units into mechanical or hydraulic impulses in order to control the pressure-regulating valves 13,14 and/or the adjusting device of the hydro-unit 8 in order to achieve a given desired value.

In order to test the aggregate 5 during an opposite direction of rotation, first the E-motor 1 must run in the opposite direction of rotation. In contrast to the aforedescribed example the oil is then drawn in through the check valve 11, the line 9,9' is the LP-line and 10,10' the HP-line.

At least one hydro-unit is preferably constructed regulatably (as is illustrated in FIG. 1 the hydro-unit 8 is assumed to be regulatable for purposes of further description). Corresponding with the possible range of regulation, it is then easily possible to rig without further changes to the described system, also testing members which have between the input and output shaft a ratio, for example a gear ratio, of up to approximately i=3. If for example, in the arrangement according to FIG. 1, the speed of the shaft at the coupling 4 is only half as great as the speed of the shaft at the coupling 6 due to the gear ratio in the testing member 5, the stroke volume of the hydro-unit 8 must be regulated so that it is only half of the conveying volume of the hydro-unit 2. If both hydro-units are regulatable, it is even possible to examine testing members having a gear ratio of up to i≈8.

Figure 4:
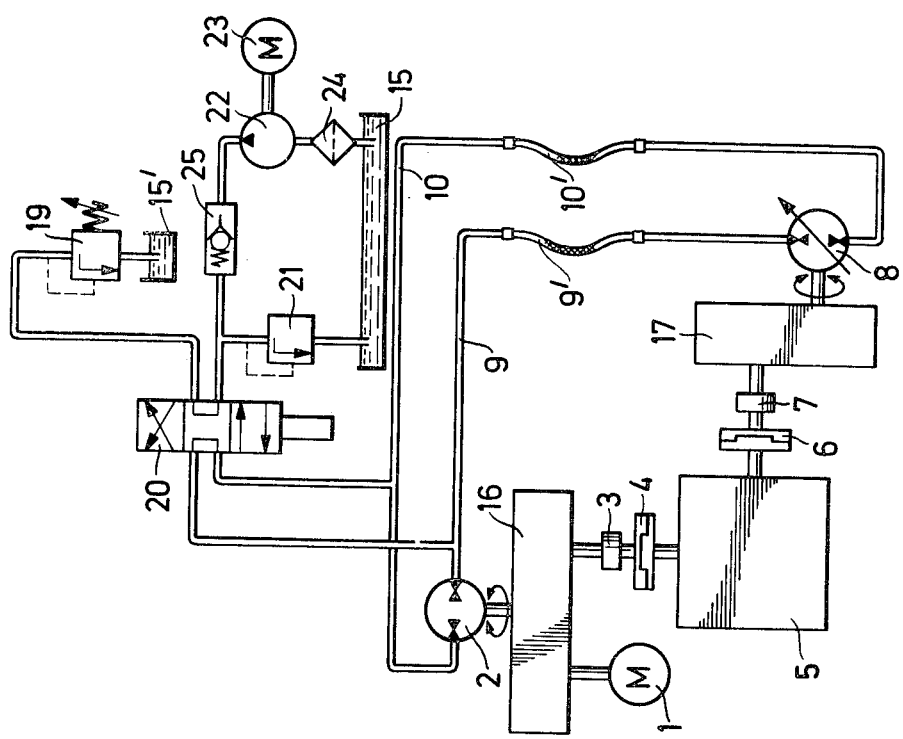
FIG. 4 illustrates an exemplary embodiment with a low pressure oil injection by means of a feed pump to compensate for leakage.
Figure 5:
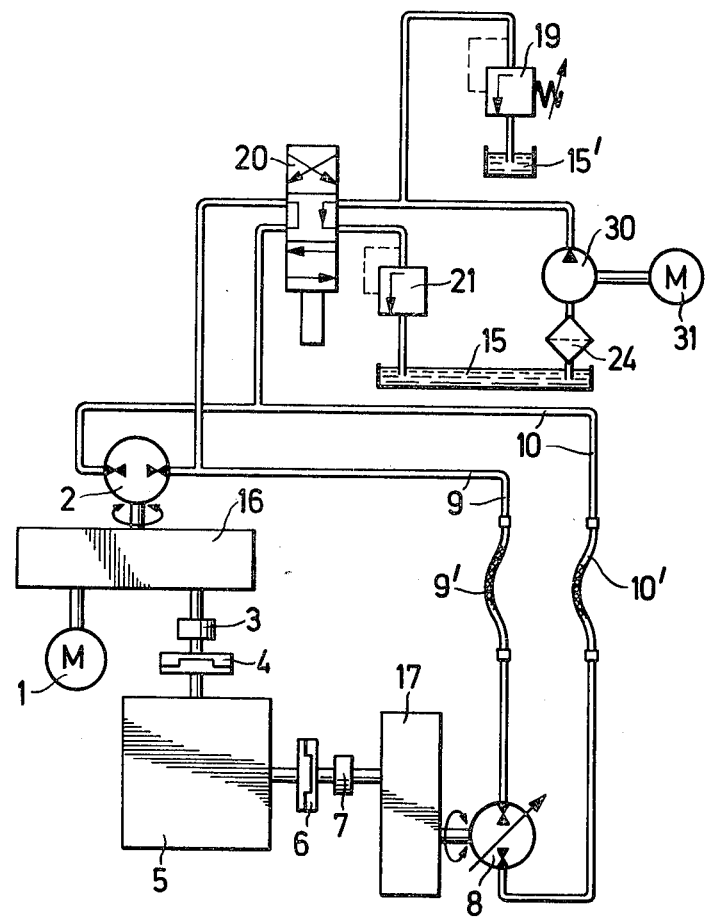
FIG. 5 illustrates an exemplary embodiment with a high pressure oil injection to compensate for leakage.

A different manner in which to consider a ratio in the testing member in the consideration of power flow is the utilization of correspondingly transmitted or geared-down intermediate gearings between the hydro-unit 8 and the testing member 5 and/or between the testing member 5 and the hydro-unit 2. Of course, a combination of regulatable hydro-unit or regulatable hydro-units and one or two intermediate gearings 16,17 is also possible. This arrangement is illustrated in FIGS. 3 to 5.

If intermediate gearings 16,17 are used, then the size of the rigging can be predetermined, as the two intermediate gearings 16,17 in testing members with a gear ratio of i=1 are not provided with the same ratio or in testing members with a gear ratio of i<>1 are provided with a difference in its ratio which difference does not correspond with this value.

Figure 2:
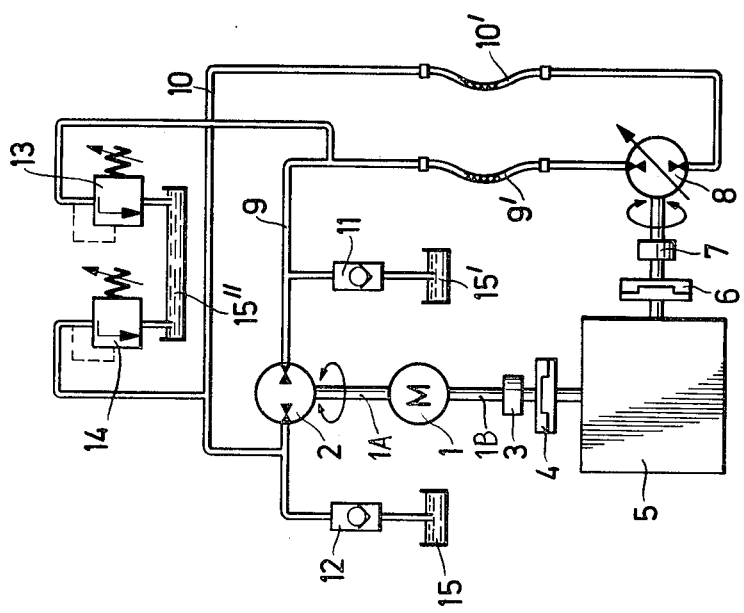
FIG. 2 illustrates a similar exemplary embodiment, in which the drive motor is connected to the power train.

In a rigging device of the aforedescribed type, an examination of the testing members under a high torque situation has relatively narrow limits, namely because the full torque load must be transmitted by the shaft of the motor 1 and the shaft is integrated into the total power flow consideration. In addition, the motor 1 and thus the shaft 1A,1B are not designed for high torque loads, because as a rule it balances out only the power loss. In such cases, a preferable arrangement of the motor 1 is illustrated in FIG. 2. Here, the motor 1 is not integrated into power flow considerations, but drives through an intermediate gearing 29 the hydro-unit 2 which functions as a pump. The intermediate gearing 29 may be a pure spur gearing without speed change, however, it is also possible to use other types of gearings. If, because of a transmission ratio existing in the testing member 5 between the hydro-unit 8 and the testing member 5 and/or between the testing member 5 and the hydro-unit 2 intermediate gearings 16,17 are necessary anyway, the motor 1 can be connected when the intermediate gearing 16 is designed accordingly also to the intermediate gearing, as is illustrated in FIG. 3.

Figure 3:
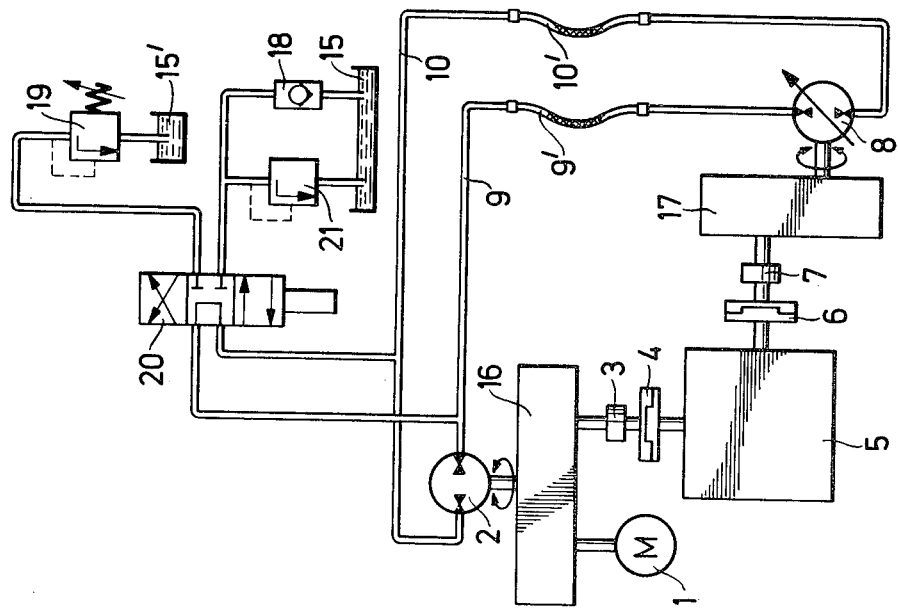
FIG. 3 illustrates an exemplary embodiment with an oil injection arrangement on the low pressure side by means of a check valve to compensate for leakage.

The exemplary embodiment according to FIG. 3 corresponds moreover, when considering power flow and oil circulation, with the exemplary embodiment according to FIGS. 1 and 2. A different advantageous possibility is here shown for introducing oil into the circuit for balancing the oil losses and for regulating pressure. Independent of the direction of rotation, the hydro-unit 2 which functions as a pump draws in the oil always through a check valve 18 from the reservoir 15 and only one pressure-regulating valve 19 is provided for the pressure regulation. If desired, a not illustrated filter can be provided between the check valve 18 and the reservoir 15. The check valve 18 is, corresponding with the conveying direction of the hydro-unit 2, connected at all times with the respective LP-side and the pressure-regulating valve 19 with the respective HP-side through a 4/3-way valve 20. A not regulatable pressure-limiting valve 21 is provided for the LP-side. The adjustment of the pressure difference $\Delta p$ between the HP- and the LP-side, which pressure difference is necessary for the various measurements which are to be performed, is done only with the pressure-regulating valve 19.

In the sofar described exemplary embodiments, the hydro-unit 2 which functions as a pump, draws in the oil which is needed for balancing the leakage losses. A precondition for this is that the oil reservoir 15,15',15" is not too far from the pump. This, however, can be disadvantageous for a rigging device which is as much as possible to be universally usable. For this reason, it is preferable to arrange the oil reservoir outside of the space which is needed for carrying out the measurements and to provide a separate pump for supplying the oil, as this is shown in FIG. 4. A pump 22, for example a gear or piston pump, is driven by a motor 23, preferably an electric motor. The pump 22 draws oil through a filter 24 and from the reservoir 15 and feeds it into the low pressure line, namely depending on the direction of rotation of the hydro-unit 2 and the corresponding position of the 4/3-way valve 20 into the line 9 or 10. The pressure in the LP-line is determined by the pressure-limiting valve 21. For the safety of the pump 22, a check valve 25 between pump 22 and 4/3-way valve 20 is preferable.

The necessary pressure difference $\Delta p$ between the HP-side and the LP-side for the various measurements is again adjusted by the pressure-regulating valve 19 which is connected to the HP-side. The remaining construction of the rigging device corresponds with the exemplary embodiments having a self-priming pump.

Compared with these exemplary embodiments, the arrangement of a separate oil pump has still a considerable advantage: If during certain tests the hydro-units 2,8 are to be driven at high speeds, cavitation damage can occur during the self-priming operation. However, this danger is substantially eliminated when feeding is done through a separate pump.

All of the sofar described exemplary embodiments have the following features in common; the rigging device can be started only without pressure and the pressure in the hydraulic part, which pressure is needed for the examinations to be carried out, is built up only after the initial starting phase. In the case of many measurements this is disadvantageous or rather the measurement cannot at all be carried out. Here a HP-side injection through a separate oil pump is offered. In the exemplary embodiment which is illustrated in FIG. 5, a pump 30, preferably a high-pressure hydro-pump, is driven by a motor 31, preferably an electric motor. The pump 30 draws the oil from the reservoir 15 through a filter 24 and feeds it into the respective high pressure line, namely depending on the direction of rotation of the hydro-unit 2 and corresponding position of the 4/3-way valve 20 into the line 9 or 10. The pressure in the LP-line is determined by the pressure-limiting valve 21. The pressure-regulating valve 19 is connected between the pump 30 and the 4/3-way valve, with which the pressure is adjusted in the HP-line and thus the respectively necessary pressure difference $\Delta p$ between the HP- and the LP-side. The discussions written in connection with the examples having a self-priming pump are valid for the remaining construction of the rigging device. Thus it is possible in this exemplary embodiment to first build up the necessary high pressure by first switching on only the motor 31 and thus the pump 30 and the pump, depending on the position of the 4/3-way valve 20, conveying oil into the line 9,9' or 10,10'. As soon as the pressure which is set on the pressure-regulating valve 19 has been reached, all oil which is not needed for balancing leakage losses is returned through the pressure-regulating valve into the reservoir. For this reason the utilization of a regulatable pump, such as pump 30, is advisable, the capacity of which can be adjusted to the leakage losses. Since the two hydro-units 2,8 are loaded with the same pressure, the mechanical part of the rigging device (components 3 to 7, 16,17) is rigged statically in itself. The magnitude of the static rigging can be adjusted as a function of the oil pressure which is variable by means of the pressure-regulating valve 19. Only when the motor 1 which is provided for balancing the occurring power losses is switched on, the static rigging is transferred into a dynamic one.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A hydraulic rigging device for testing of drive aggregates, as for example shafts, couplings, gears and gearings, comprising:
   a pair of hydro-units of which one functions as a pump, the other one functions as a motor, each of said hydro-units having a shaft thereon;
   a drive means for driving the shaft on said hydro-unit functioning as a pump;
   means defining a high pressure line and a low pressure line connected in circuit with said hydro-units such that an oil circulation circuit is created, whereby each line changes the pressure range upon reversal of the conveying direction of the hydro-unit which functions as a pump;
   a testing member having a pair of rotatable shafts thereon interconnected therewith, a driving rotation of either one of said shafts effecting a driven rotation of the other shaft, whereby the torque output on the shaft from the hydro-unit which functions as a motor is included into the power flow consideration of the rigged mechanical system and is used to drive through said testing member said hydro-unit which functions as a pump, so that said drive means must then only yet balance out the occurring losses within the system;
   pressure-regulating means for limiting the pressures in said high pressure line and said low pressure line, whereby the pressure difference is co-determining for the magnitude of said rigging; and means for balancing out the leakage losses which are created in the oil circultion circuit.

2. The hydraulic rigging device according to claim 1, wherein said pressure-regulating means includes a pressure-regulating valve and a check valve for adjustably limiting the pressure in the high pressure line and in the low pressure line, said pressure-regulating valve being connected to an oil reservoir connected to the respective low pressure side of the hydro-unit which functions as a pump, through which check valve oil which is missing due to leakage losses is again drawn in.

3. The hydraulic rigging device according to claim 1, wherein said pressure-regulating means includes a pressure-regulating valve for adjusting the pressure in the high pressure line and a pressure-limiting valve for the pressure adjustment in the low pressure line, which are connected through a reversing valve, for example a 4/3-way valve, depending on the conveying direction of the hydro-unit which functions as a pump to the respective corresponding line.

4. The hydraulic rigging device according to claim 3, wherein said balancing means includes a check valve which is connected to an oil reservoir, through which check valve the oil which is missing due to leakage losses is again drawn in and which is connected through said 4/3-way valve to the respective low pressure line.

5. The hydraulic rigging device according to claim 3, wherein said balancing means includes a pump which is driven by a separate motor draws oil from a reservoir and feeds it through said 4/3-way valve into the respective low pressure line for balancing out the oil missing due to leakage losses.

6. The hydraulic rigging device according to claim 3, wherein said balancing means includes a pump which is driven by a separate motor draws oil from a reservoir and feeds it through a 4/3-way valve into the respective high pressure line for balancing out the oil missing due to leakage losses.

7. The hydraulic rigging device according to claim 1, wherein at least one of said pair of hydro-units are variable in the stroke volume.

8. The hydraulic rigging device according to claim 1, wherein between said pair of hydro-units and the testing member there are arranged couplings which are stiff against rotation, and which at an otherwise equal design can be equipped for connection to the most various testing members with various adapters.

9. The hydraulic rigging device according to claim 1, wherein the lines between the hydraulic units which function as a pump and as a motor for balancing the different dimensions which exist in the various testing members are constructed at least on a portion of their length as hose line.

10. The hydraulic rigging device according to claim 1, wherein at least between one hydro-unit and the testing member there is arranged a measuring shaft.

11. The hydraulic rigging device according to claim 5, wherein the conveying volume of said pump can be regulated.

12. The hydraulic rigging device according to claim 1, wherein the drive means are reversible.

* * * * *